Nov. 8, 1938.   H. P. KIRCHNER ET AL   2,136,107
METHOD FOR PRODUCING CARBIDES
Filed March 23, 1935

INVENTOR.
HENRY P. KIRCHNER
RAYMOND C. BENNER
BY  R C Benner.
ATTORNEY.

Patented Nov. 8, 1938

2,136,107

UNITED STATES PATENT OFFICE 2,136,107

METHOD FOR PRODUCING CARBIDES

Henry P. Kirchner and Raymond C. Benner, Niagara Falls, N. Y., assignors, by mesne assignments, to The Carborundum Company, Niagara Falls, N. Y., a corporation of Delaware Application March 23, 1935, Serial No. 12,566

6 Claims. (Cl. 23—208)

This invention relates to electric heating apparatus, and to a method of electric heating especially adapted for the continuous production of melts free from excess carbon. The apparatus and method herein described are primarily intended for the production of boron carbide, but can be used for the reduction of the oxides of other elements or the melting of materials which readily absorb carbon. The method is of particular advantage where the charge to be reduced becomes viscous or "pasty" before the necessary reaction temperature is reached, and where swelling or bloating results from the passage of gas through the mix.

In the manufacture of boron carbide by the reduction of boric oxide, the boric oxide melts at a very low temperature, but the reactions necessary to produce fused boron carbide do not take place until a temperature of about 2400° C. or greater is reached. The only known refractory which can be used at these temperatures under reducing conditions is carbon. If it is attempted to use a carbon container for the charge and heat the mix to the required temperature by the passage of heat through the container, the carbon monoxide gas liberated during the reaction, on passing through the viscous unconverted mixture of molten boric oxide and carbon, causes a swelling of the mix, and in most cases only a small portion of the material can be kept in any reasonably proportioned container. If reduction to boron carbide does take place, the material on melting readily dissolves carbon from the container, and the boron carbide on solidification is contaminated with a considerable quantity of graphite.

We have found that if a mixture containing boric oxide (or other oxides which become pasty or fluid before reduction) is heated from above by direct radiation of an electrically heated resistor, the swelling of the mix by the gas formed in the reduction reaction can be greatly reduced. The gas resulting from the reaction is liberated from the upper surface of the mix, and does not have to pass through the entire viscous unconverted mix in order to escape to the atmosphere. With this method of heating, the lower portions of the raw mix which are not converted or reduced can be used as a container for the molten material resulting from the reduction of the charge. With such a procedure, there is no contamination whatever from the carbon container supporting the charge. Microscopic examination of polished sections of boron carbide containing materials made by this method have shown that they are entirely free from the usual graphite flakes characteristic of fused boron carbide.

The nature of the present invention will be more clearly understood from a consideration of the accompanying drawing.

Figure 1:
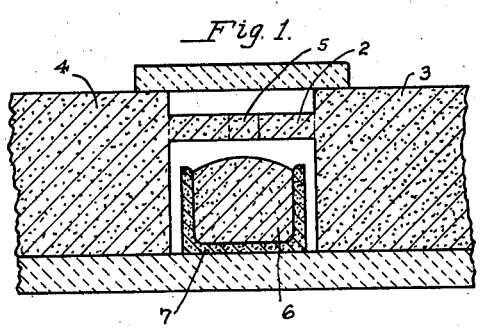
Figure 1 illustrates diagrammatically a method of heating wherein a carbon slab resistor is placed above the charge and the charge heated from above by radiation.
Figure 2:
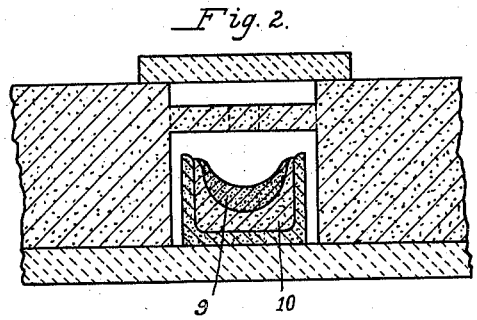
Figure 2 shows the approximate shrinkage in a charge containing boric oxide and carbon after reduction of a part of the boric oxide to boron carbide.

Referring to the drawing in detail, Figures 1 and 2 illustrate the changes which take place when a mixture of boric oxide and carbon in the proper proportions to form boron carbide is heated from above by direct radiation. Figure 1 shows a carbon resistor 2 positioned between two large carbon electrodes 3 and 4. The resistor may be a carbon slab which is preferably restricted at its central portion 5 so as to localize the heat over the middle part of the charge. The raw mix 6, which is contained in a carbon container 7, is originally slightly higher in the central portion than at the edges near the walls of the container, and is placed below the resistor. The entire apparatus is enclosed in a suitable refractory chamber to prevent oxidation of the boron carbide. For the manufacture of pure boron carbide, the mix used can be composed of approximately 63 per cent anhydrous boric oxide and 37 per cent carbon. In the commercial manufacture of boron carbide it is customary to add a small quantity of a mineral oil such as kerosene to the dry mix, and this procedure can be used in connection with the present mix. The function of the kerosene is not entirely understood, but it seems to permit a denser packing of the mix, and facilitates the escape of gases. Upon heating of the mix by radiant heat from the extremely hot portion 5 of the resistor, the top portion at first swells slightly and then recedes, until it presents a contour similar to that shown in Figure 2. In this figure, the molten boron carbide 9 is contained in the portion of the raw mix 10 which is not completely converted to boron carbide. It will be observed that there is a considerable decrease in volume in the charge after heating is completed, since approximately 70 per cent of the original charge involved in the reaction is converted to carbon monoxide gas. It is this enormous volume of gas which causes the mix to swell and bloat when it is attempted to manufacture boron carbide by passing heat through the receptacle in which the raw mix is contained.

Figure 3:
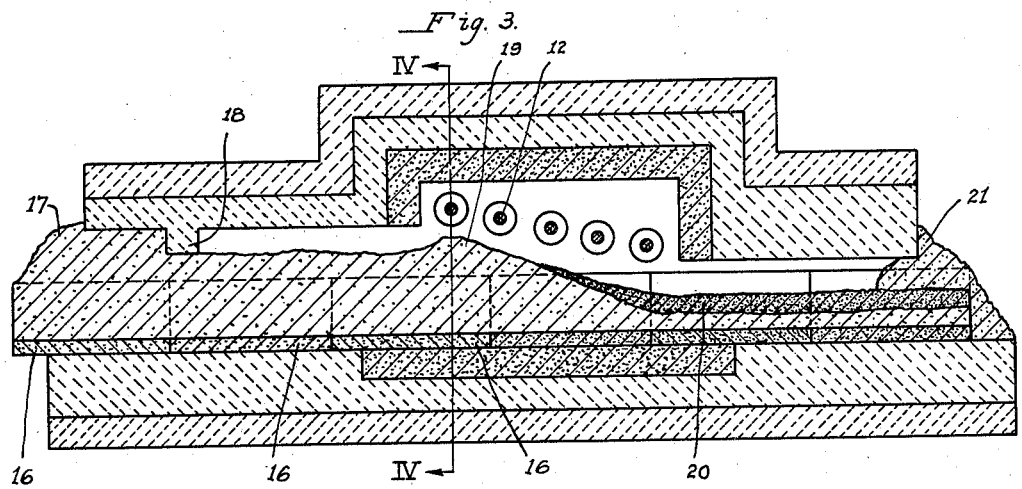
Figure 3 shows a section of a furnace in which a series of containers are passed under a bank of resistors to convert the top portion of the mix to molten carbide or other reduced product.
Figure 4:
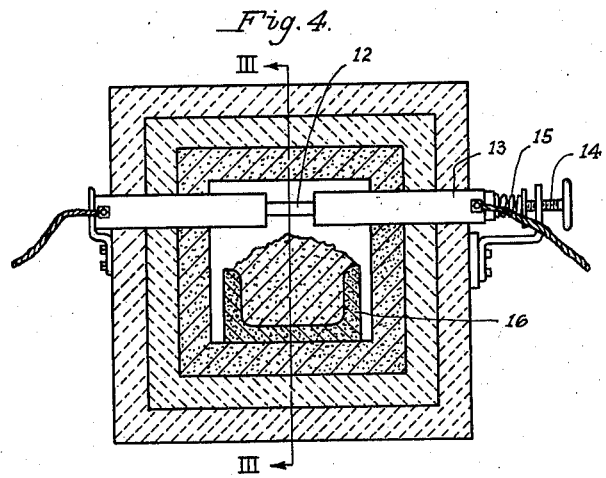
Figure 4 is a section of the furnace shown in Figure 3, the section being taken along the line IV—IV.

A furnace for the continuous production of fused carbides without contamination from carbon and with the elimination of other difficulties encountered with ordinary methods of heating is shown in Figures 3 and 4. In this furnace a series of carbon resistors 12 are positioned across the top of the furnace. These resistors are positioned between heavy carbon electrodes 13, as indicated in Figure 4; contact is made with the resistor ends by pressure applied by means of the screw 14, the pressure being applied resiliently through the spring 15. The raw mix is placed in a series of containers 16 which are moved along the floor of the furnace. The upper portion of the mix is heated to a temperature of approximately 2000 to 2600° C., depending upon the nature of the product being prepared. In the case of pure fused boron carbide a temperature in excess of 2400° C. is required; for a fusion of boron carbide with other carbides such as silicon carbide or zirconium carbide, or for the preparation of crystalline boron carbide without melting the final product, a somewhat lower temperature can be employed.

In order to compensate for the large decrease in volume of the mix during conversion and melting, and to facilitate the conversion of a greater percentage of the charge, the resistors can be arranged so that they are closer to the charge when it leaves the hot zone of the furnace than at the point where the charge first enters the hot zone. One method of accomplishing this result is shown in Figure 3, where the resistors 12 are arranged in a plane at an angle with the floor of the furnace.

In the production of boron carbide or other carbides by the continuous process illustrated in Figure 3, the evolution of carbon monoxide gas from the reduction of the oxide by carbon forms an atmosphere which can be used to protect the carbide from oxidation. For the purpose of maintaining this carbon monoxide atmosphere, the gas may be burned at the ports at either end of the furnace or a curtain of burning or combusted gases can be provided across the openings to the furnace. An artificial protective atmosphere can of course be employed if desired.

Where the furnace chamber is sufficiently long to prevent fusion of the boric oxide at the entrance to the furnace, or where a more refractory oxide is employed in the reduction reaction, the furnace at the end where the mix is introduced can be sealed by a layer of raw mix. In Figure 3, the raw mix 17 forms a seal for the end of the furnace, and the refractory projection 18 serves to strike off the mix to the proper level. On reaching the point 19 the mix swells slightly from the applied heat, and then recedes as indicated at the point 20. At the end where the charge leaves the furnace, the entrance is sealed by granular graphite or coke 21.

While the method and apparatus illustrated above have been described specifically in connection with the manufacture of boron carbide, it will be understood that many other carbides such as tungsten carbide, zirconium carbide, titanium carbide and chromium carbide can be prepared by the method indicated so as to obtain products free from excess carbon. Many of these materials are difficult to prepare in a pure fused state, and cannot be prepared with ordinary methods of heating.

We have also found the process herein described advantageous in the remelting of boron carbide without contamination from carbon. Fused compositions containing boron carbide and other carbides or metallic ingredients can be readily prepared by this method, and the carbon content controlled within accurate limits. By maintaining an atmosphere which is slightly oxidizing with respect to the melt, it is even possible to produce fused carbide compositions deficient in carbon, in which the carbides present are alloyed with metallic elements or the elements present in the carbide before partial oxidation. Such a control is impossible with ordinary heating methods, owing to the extremely high temperatures required, and the difficulty of finding a suitable container.

Having thus described our invention, we claim:

1. The method of making boron carbide which comprises forming a relatively large mix of boric oxide and carbon, heating the mix from the top downward by means of a heat source so located and arranged above the top surface of the mix and at such a distance therefrom that the temperature of the surface of the mix is approximately 2400° C. and that the heat is distributed over the top surface of the mix while the mix is in a pasty condition and gas is escaping through it, whereby the gas is liberated first from the top portion of the mix and the mix gradually recedes without substantial bloating, and continuing the heating process until a substantial proportion of the mix is converted to boron carbide.

2. The method of making boron carbide which comprises forming a relatively large mixture containing boric oxide and carbon, heating the mixture from the top downward by means of a carbon resistor, so located and arranged above the top surface of the mix and at such a distance therefrom that the temperature of the surface of the mix is approximately 2400° C. and that the heat is distributed over the top surface of the mixture while the mixture is in a pasty condition and gas is escaping through it, whereby the gas is liberated first from the top portion of the mixture and the mixture gradually recedes without substantial bloating, and continuing the heating process until a substantial proportion of the mixture is converted to boron carbide.

3. The method of continuously making boron carbide which comprises forming a relatively large mixture containing boric oxide and carbon, placing the mixture on a refractory support, passing said mixture under an overhead heat source by movement of said support with respect to the heat source, said heat source so located and arranged above the top surface of the mixture and at such a distance therefrom that the temperature of the surface of the mixture is approximately 2400° C. and that the heat is distributed over the top surface of the mixture while the mixture is in a pasty condition and gas is escaping through it, whereby the gas is liberated first from the top portion of the mixture and the mixture gradually recedes without substantial bloating, continuing the heating process until a substantial proportion of the mixture is converted to boron carbide, removing the reduced composition from the vicinity of the heat source and thereafter passing additional unconverted mix below the source of heat.

4. The method of continuously making boron carbide which comprises forming a relatively large mixture containing boric oxide and carbon, placing the mixture on a refractory support, passing said mixture under a plurality of overhead heat sources by movement of said support with respect to the heat sources, said heat sources so located and arranged above the top surface of the mixture and at such a distance therefrom that the temperature of the surface of the mixture is approximately 2400° C. and that the heat is distributed over the top surface of the mixture while the mixture is in a pasty condition and gas is escaping through it, whereby the gas is liberated first from the top portion of the mixture and the mixture gradually recedes without substantial bloating, positioning said heat sources to conform approximately with the contour of the mixture as it shrinks during reduction, continuing the heating process until a substantial proportion of the mixture is converted to boron carbide, removing the reduced composition from the vicinity of the heat sources as additional mix is introduced into the opposite end of the furnace.

5. The method of making boron carbide compositions which comprises forming a relatively large mixture containing boric oxide and carbon, heating the mixture from the top downward by means of a heat source so located and arranged above the top surface of the mixture and at such a distance therefrom that the temperature of the surface of the mixture is approximately the formation temperature of boron carbide and that the heat is distributed over the top surface of the mixture while the mixture is in a pasty condition and gas is escaping through it, whereby the gas is liberated first from the top portion of the mixture and the mixture gradually recedes without substantial bloating, and continuing the heating process until a substantial portion of the mixture is converted to boron carbide.

6. The method of continuously making boron carbide compositions which comprises forming a relatively large mixture containing boric oxide and carbon, placing the mixture on a refractory support, passing said mixture under an overhead heat source by movement of said support with respect to the heat source, said heat source so located and arranged above the top surface of the mixture and at such a distance therefrom that the temperature of the surface of the mixture is above the formation temperature of boron carbide but below approximately 2600° C. and that the heat is distributed over the top surface of the mixture while the mixture is in a pasty condition and gas is escaping through it, whereby the gas is liberated first from the top portion of the mixture and the mixture gradually recedes without substantial bloating, continuing the heating process until a substantial proportion of the mixture is converted to boron carbide, removing the reduced composition from the vicinity of the heat source and thereafter passing additional unconverted mix below the source of heat.

HENRY P. KIRCHNER.
RAYMOND C. BENNER.